United States Patent [19]

Peickert

[11] Patent Number: 5,220,270
[45] Date of Patent: Jun. 15, 1993

[54] BATTERY CHARGING DEVICE WITH SECURED CONTACT UNIT

[75] Inventor: Andreas Peickert, South Bend, Ind.

[73] Assignee: Automatic Technologies, Inc., South Bend, Ind.

[21] Appl. No.: 873,021

[22] Filed: Apr. 24, 1992

[51] Int. Cl.⁵ ............................................. H02J 7/00
[52] U.S. Cl. ......................................... 320/2; 439/71
[58] Field of Search ................ 320/2; 429/96, 97, 98, 429/99, 100, 163; 439/71, 72, 289, 500

[56] References Cited

U.S. PATENT DOCUMENTS

| | | | |
|---|---|---|---|
| 3,644,873 | 2/1972 | Dalton et al. | 320/2 X |
| 3,659,180 | 4/1972 | Urbush | 320/2 |
| 3,728,664 | 4/1973 | Hurst | 320/2 X |
| 4,050,755 | 9/1977 | Hasircoglu | 439/71 |
| 4,530,554 | 7/1985 | Velsher et al. | 439/71 X |
| 4,578,628 | 3/1986 | Siwiak | 320/2 |
| 5,052,943 | 10/1991 | Davis | 320/2 X |

FOREIGN PATENT DOCUMENTS

| | | | |
|---|---|---|---|
| 1098782 | 1/1968 | United Kingdom | 320/2 |
| 1455081 | 11/1976 | United Kingdom | 439/289 |

Primary Examiner—Emanuel T. Voeltz
Assistant Examiner—Kristine Peckman
Attorney, Agent, or Firm—James D. Hall

[57] ABSTRACT

A charging device for a portable battery device in which the device includes a housing and a contact unit for charging engagement with the battery device. The contact unit is secured in place within the housing by wedging the platform of the contact unit under a beveled lip. The platform is then secured in place by a retaining ring.

6 Claims, 2 Drawing Sheets

BATTERY CHARGING DEVICE WITH SECURED CONTACT UNIT

SUMMARY OF THE INVENTION

The invention relates to a recharging device which is used to recharge the batteries of various portable devices, such as telephones and flashlights. The invention may also have applications in other lightweight hand held electrical components.

The invention teaches a novel way to attach an electrical object, shown in the following description as a contact unit, on a wall surface of the recharging device in a quick and efficient manner of assembly. The invention secures the electrical object without the use of screws, rivets or similar securing devices. The electrical object is fitted into an accommodating recess containing a beveled lip and partition and is held firmly within the recess, between the beveled lip and partition, by a retaining ring in an efficiently secured position.

Accordingly, it is a purpose of this invention to provide a novel and useful means to secure an object, and specifically a recharging contact, to a wall surface of a recharging device, allowing for greater time and cost efficiency without sacrificing quality.

Another purpose of this invention is to provide a novel and efficient way to secure a contact part within an electrical housing.

Other purposes of this invention will become apparent upon reading the following description.

BRIEF DESCRIPTION OF DRAWINGS

A preferred embodiment of this invention has been chosen for purposes of description wherein.

DESCRIPTION OF THE PREFERRED EMBODIMENT

The preferred embodiment illustrated is not intended to be exhaustive or to limit the invention to the precise form disclosed. It is chosen and described in order to explain the invention and its application and practical use to thereby enable others skilled in the art to utilize the invention.

Figure 1:
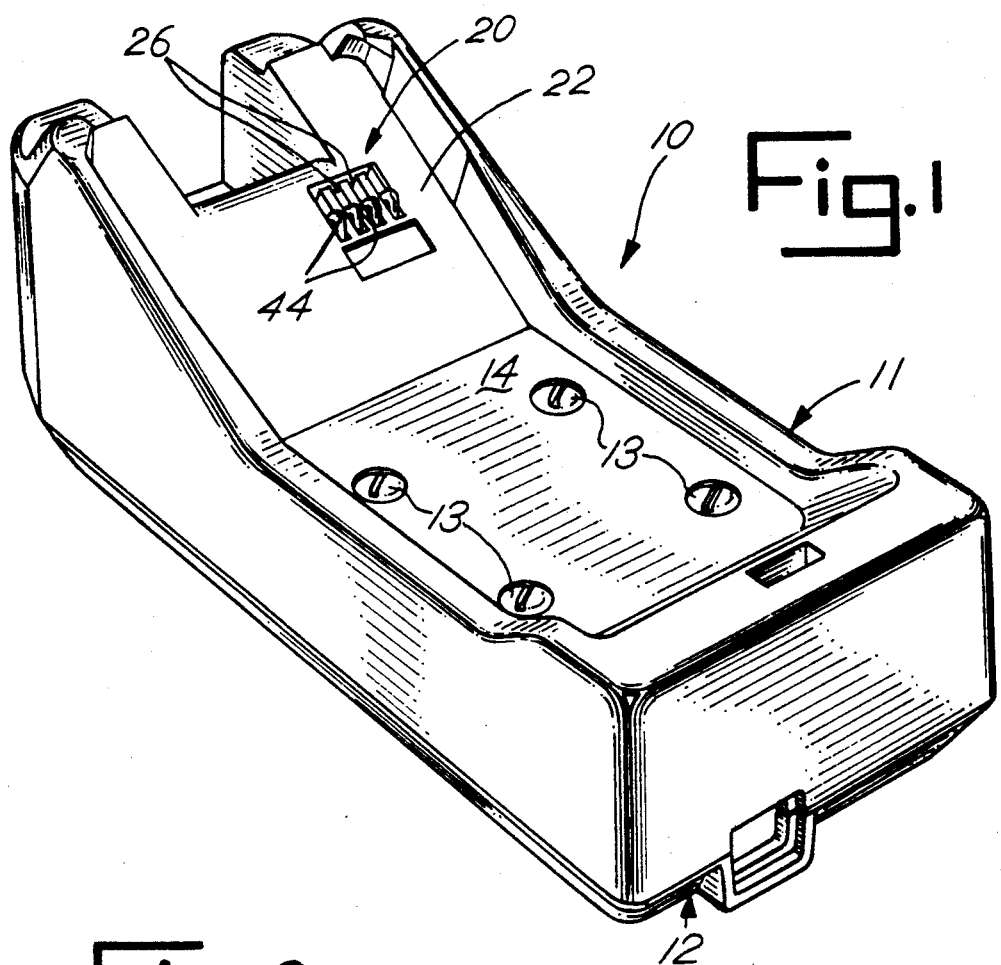
FIG. 1 is a perspective view of the charging unit with the contact unit assembled therein.
Figure 2:
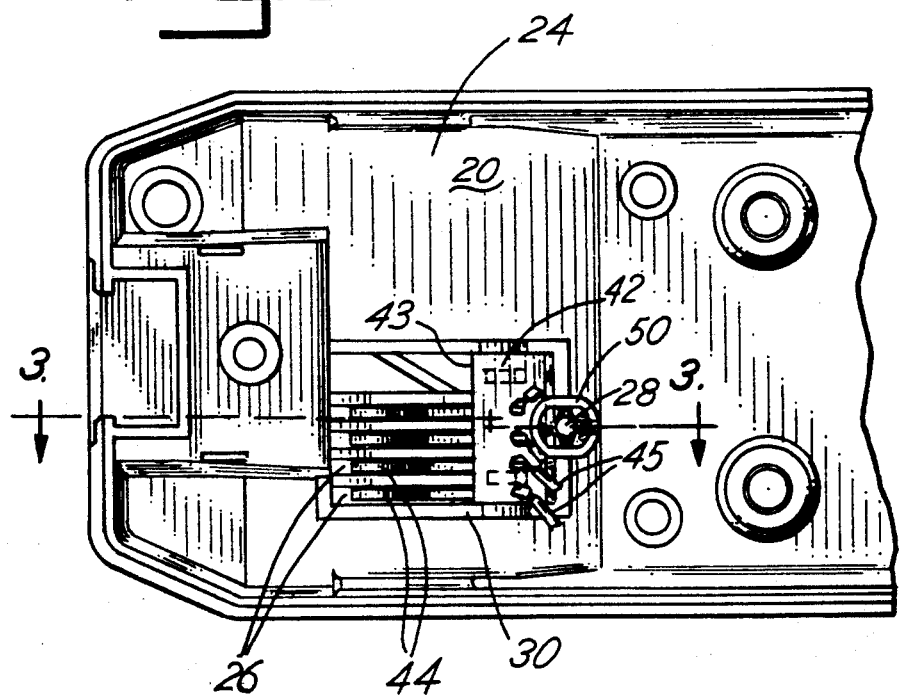
FIG. 2 is a fragmentary plan view of the charging unit as seen from the bottom with the lower housing part of the recharger housing removed and showing the inner surface of top wall part with the contact unit in its secured and assembled position.
Figure 4:
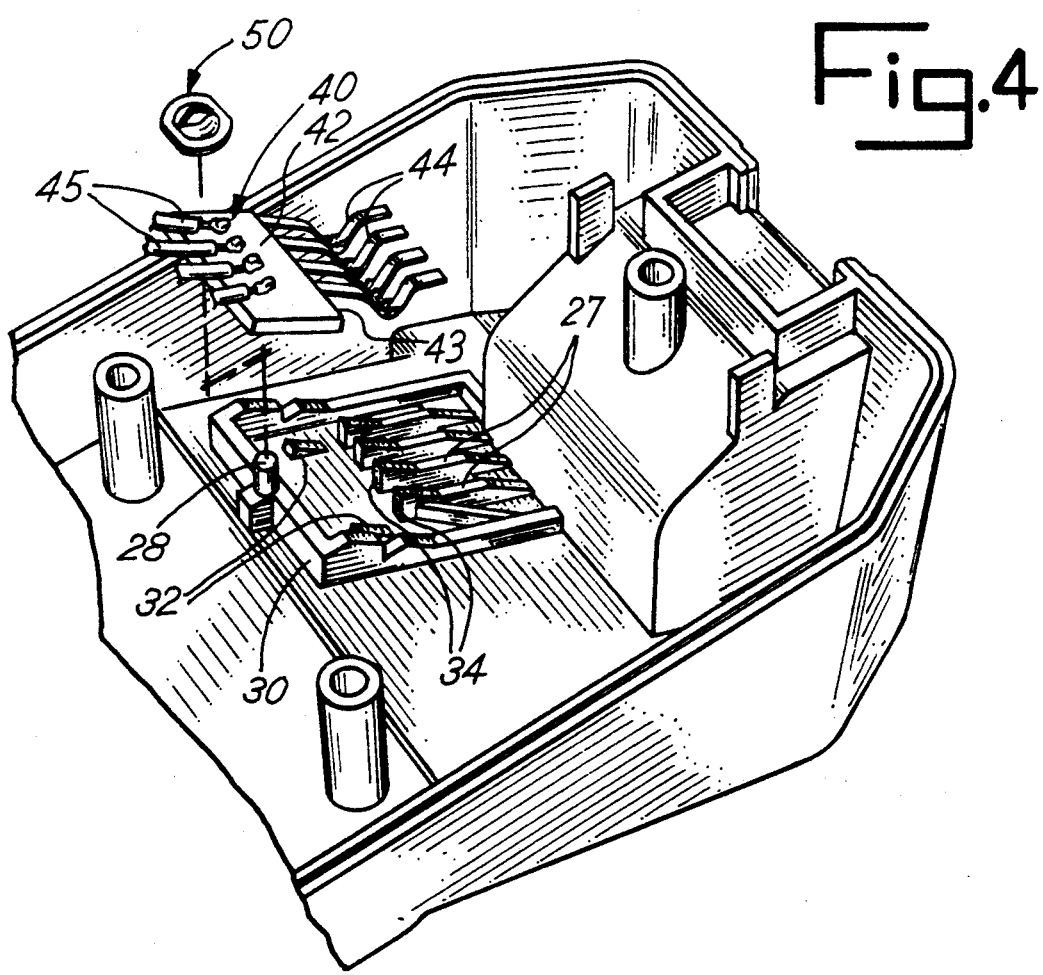
FIG. 4 is a perspective view of the contact unit shown seated in the recharger housing.

As shown in FIG. 1, the charging unit 10 includes an upper housing part 11 and a lower housing part 12 which is removably secured to the upper housing part by screws 13. Upper housing part 11 includes a cradle 14 for nesting a battery powered phone (not shown). Cradle 14 is formed in part by a wall 20. Wall 20 has an outer surface 22 and inner surface 24. As best shown in FIGS. 1, 2 and 4, wall 20 also has slots 26 formed in it. Slots 26 are separated by internal ribs 27 which extend outwardly from wall inner surface 24 and terminate at beveled lips 34 within an enclosure 30 which extends outwardly from wall inner surface 24.

Figure 3:
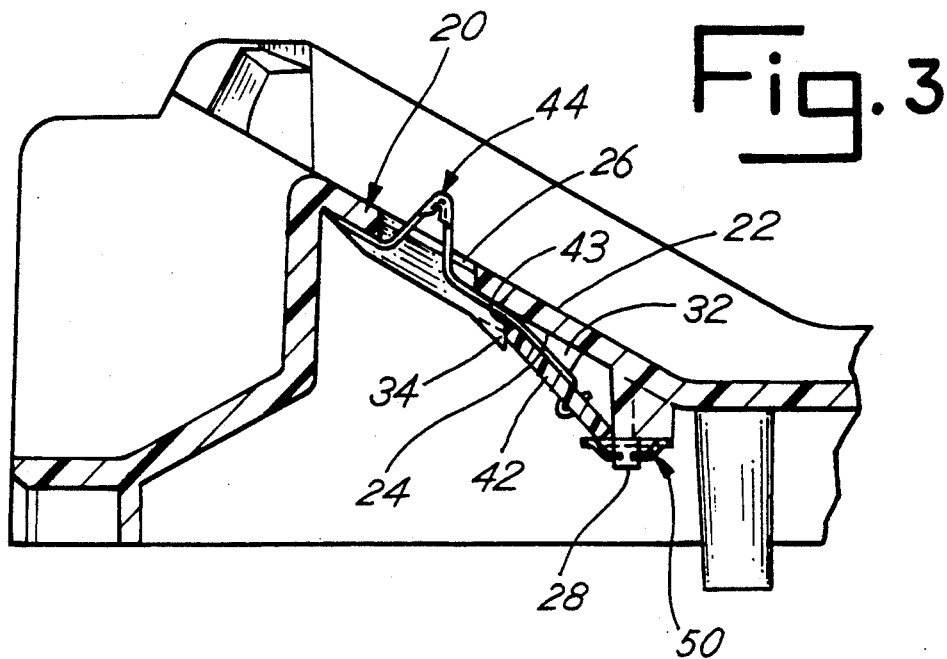
FIG. 3 is a fragmentary sectional view of the charging unit as viewed along line 3—3 of FIG. 2.

As shown in FIGS. 2-4, post 28, oppositely located from the beveled lips 34 of said internal ribs 27, extends outwardly from wall inner surface 24. Supports 32 also extend outwardly from inner surface 24 within enclosure 30 and between beveled lips 34 and post 28. The contact unit 40 includes a dielectric platform 42 and flexible contacts 44 to which leads 45 are connected. Leads 45 go to the electrical power input (not shown) for the unit. The contact unit is held in place by retainer ring 50.

As shown in FIGS. 2 and 3, the contact(s) 44 of the contact unit travel between internal ribs 27, past inner surface 24 through wall opening(s) 26 and extend beyond outer surface 22. Contact platform 42 rests upon supports 32 and ribs 27 are prevented from moving in the lateral direction by placing the contact platform 42 under beveled lips 34 of ribs 27 and within enclosure 30. Outward movement of contact platform 42 is prevented as retaining ring 50 is fitted restrictively on post 28, holding the contact unit 40 firmly in place within wall partition enclosure 30.

It is understood that the above description does not limit invention to the given details, but may be modified within the scope of the following claims.

I claim:

1. A battery charging unit comprising a housing, said housing including a wall, said wall having an outer surface and an inner surface and an opening extending through the wall from said outer surface to said inner surface, said wall outer surface defining means for receiving a battery powered portable device, a contact unit including a platform and a contact, said wall at its inner surface having a beveled lip, said contact unit resting against said wall and having an edge thereof fitted under said beveled lip with said contact thereof extending into said wall opening from said wall inner surface to said wall outer surface, and a securement device in addition to said wall lip securing said contact unit against said wall.

2. The unit of claim 1 wherein said wall includes internal ribs projecting outwardly from said wall inner surface at opposite sides of said wall opening, each rib terminating in said beveled lip, said contact of the contact unit located between said ribs.

3. The unit of claim 1 wherein said wall includes internal supports projecting outwardly from said wall inner surface upon which said contact platform rests.

4. The unit of claim 1 wherein said wall includes an enclosure means projecting outwardly from said wall inner surface for supporting and preventing lateral movement of said contact unit.

5. The unit of claim 1 wherein said securement device includes a post which extends outward from said wall inner surface opposite from said beveled lip and a retainer ring carried by said post overlying said platform.

6. The unit of claim 1 wherein said opening includes a plurality of openings extending through the wall from said outer surface to said inner surface, said wall including a plurality of ribs, each rib projecting outwardly from said inner surface thereof along each of said wall openings, said contact unit having a plurality of contact means each extending into one of said wall openings from said wall inner surface to said wall outer surface.

* * * * *